United States Patent
Mori et al.

(10) Patent No.: US 8,731,488 B2
(45) Date of Patent: May 20, 2014

(54) WIRELESS COMMUNICATION APPARATUS AND METHOD

(75) Inventors: Hiroki Mori, Kawasaki (JP); Yasuhiko Tanabe, Kawasaki (JP); Tsuguhide Aoki, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 30 days.

(21) Appl. No.: 13/101,589

(22) Filed: May 5, 2011

(65) Prior Publication Data
US 2011/0244816 A1    Oct. 6, 2011

Related U.S. Application Data

(63) Continuation of application No. PCT/JP2009/068721, filed on Oct. 30, 2009.

(30) Foreign Application Priority Data
Nov. 5, 2008    (JP) ................................. 2008-284745

(51) Int. Cl.
*H03C 7/02*    (2006.01)

(52) U.S. Cl.
USPC ..... 455/101; 455/103; 455/114.2; 455/115.1; 375/267; 375/296

(58) Field of Classification Search
USPC ............ 455/562.1, 7, 101, 103, 114.2, 115.1; 375/267, 358, 296
See application file for complete search history.

(56) References Cited

U.S. PATENT DOCUMENTS

| 6,842,632 | B2 * | 1/2005 | Raghothaman et al. | ... 455/562.1 |
| 7,212,838 | B2 * | 5/2007 | Raghothama | .............. 455/562.1 |
| 7,965,803 | B2 * | 6/2011 | Wang et al. | .................... 375/358 |
| 2010/0304666 | A1 * | 12/2010 | Hottinen et al. | .................. 455/7 |

FOREIGN PATENT DOCUMENTS

JP    2008-79262    4/2008

OTHER PUBLICATIONS

C. Windpassinger, R. Fischer, and J. Huber, "Lattice-Reduction Aided Broadcast Precoding," IEEE Trans. On Communications, vol. 52, No. 12, pp. 2057-2060, Dec. 2004.
Japanese Office Action dated Nov. 13, 2012 from corresponding JP Patent Application No. 2008-284745, 7 pages.

(Continued)

*Primary Examiner* — Junpeng Chen
(74) *Attorney, Agent, or Firm* — Ohlandt, Greeley, Ruggiero & Perle, L.L.P.

(57) ABSTRACT

According to one embodiment, a wireless communication apparatus includes a perturbation vector addition unit, a weight multiplication unit and a normalization coefficient multiplication unit. The perturbation vector addition unit is configured to add a perturbation vector only to a first data signal of a first transmission signal containing a first pilot signal and the first data signal, and obtain a second transmission signal containing a second pilot signal and a second data signal. The weight multiplication unit is configured to multiply each of the second pilot signal and the second data signal by a weight for removing interference on a reception side, and obtain a third transmission signal containing a third pilot signal and a third data signal. The normalization coefficient multiplication unit is configured to multiply each of the third pilot signal and the third data signal by a common normalization coefficient for normalizing a total transmission power.

18 Claims, 9 Drawing Sheets

(56) References Cited

OTHER PUBLICATIONS

Chua, et al.; "A Continuous Vector-Perturbation for Multi-Antenna Multi-User Communication"; Vehicular Technology Conference, 2007. VTC2007—Spring; IEEE 65th, Apr. 22, 2007, pp. 1806 to 1810.

Jalden, et al.; "On the Diversity Order of Vector Perturbation Precoding with Imperfect Channel State Information"; Signal Processing Advances in Wireless Communications, 2008; SPAWC 2008; IEEE 9th Workshop on Jul. 6, 2008; pp. 211 to 215.

Ryan, et al., "*A Lattice-Theoretic Analysis of Vector Perturbation for Multi-User MIMO Systems*"; IEEE, Nov. 11, 2008, pp. 3340-3344.

Vikalo, et al., "*Asymptotic Analysis of the Gaussian Broadcast Channel with Perturbation Preprocessing*"; IEEE 2006, pp. IV-777-IV-780.

Hochwald, et al., "*A Vector-Perturbation Technique for Near-Capacity Multiantenna Multiuser Communication—Part II: Perturbation*"; IEEE 2005, pp. 537-544.

International Search Report and Written Opinion dated Nov. 24, 2009 from PCT/JP2009/068721.

English Translation of International Preliminary Report on Patentability Chapter I (IB/373) dated Jun. 7, 2011.

English Translation of the Written Opinion of the International Search Authority dated Jun. 7, 2011.

\* cited by examiner

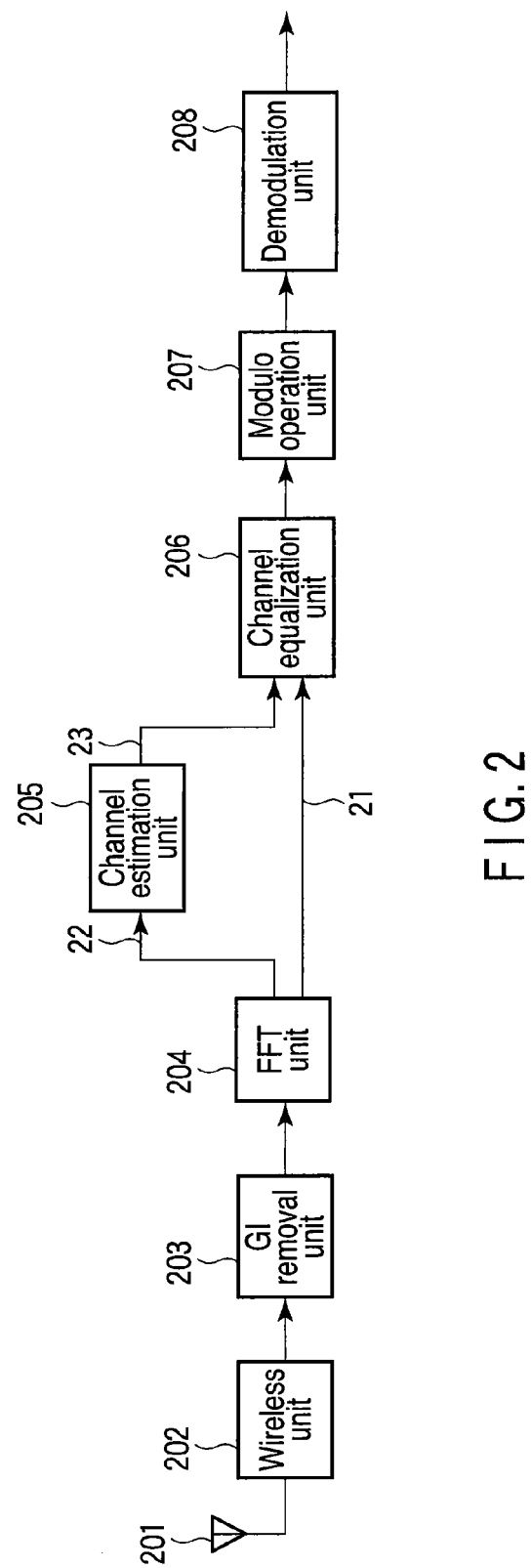
F I G. 2

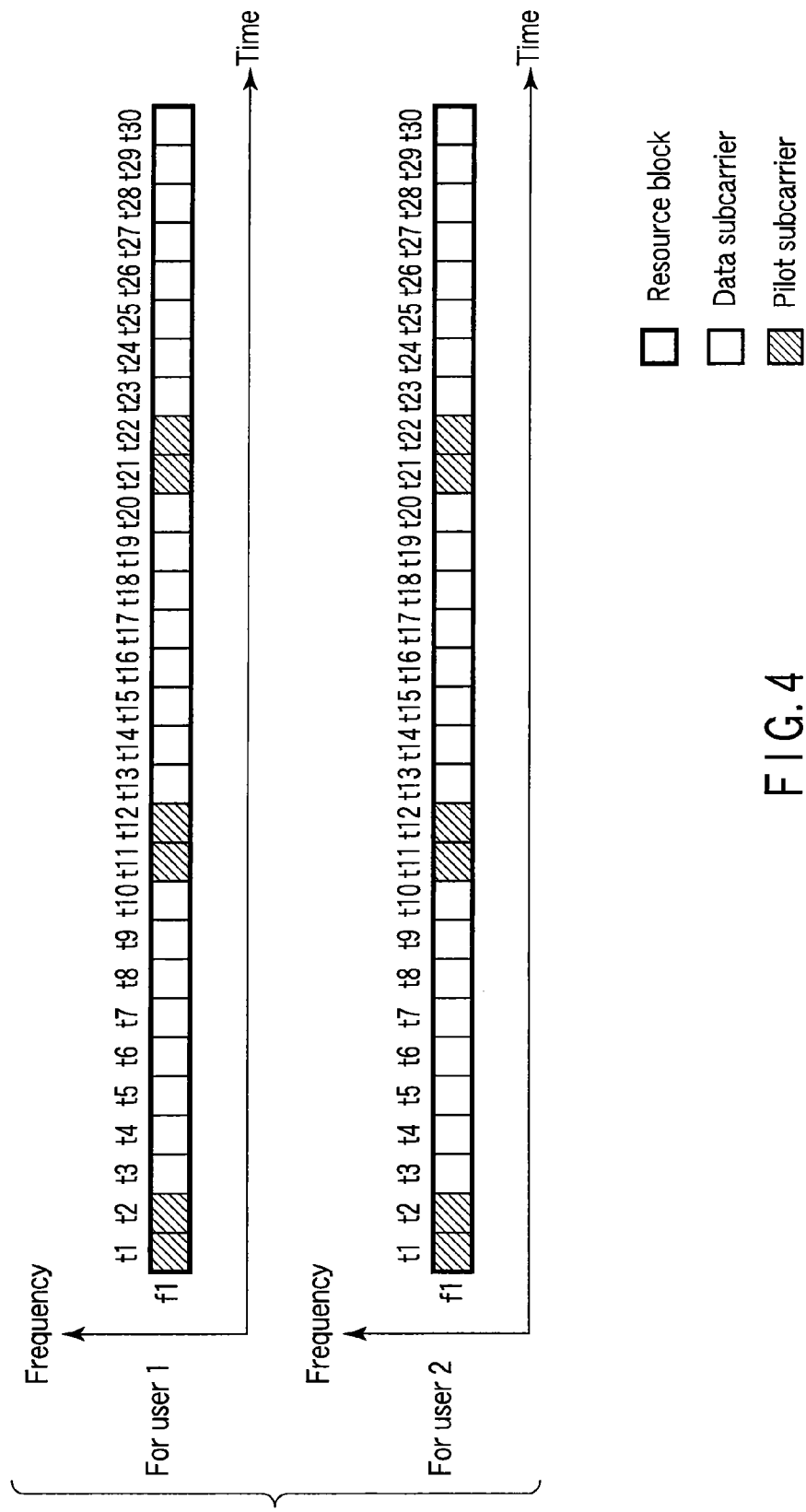
F I G. 4

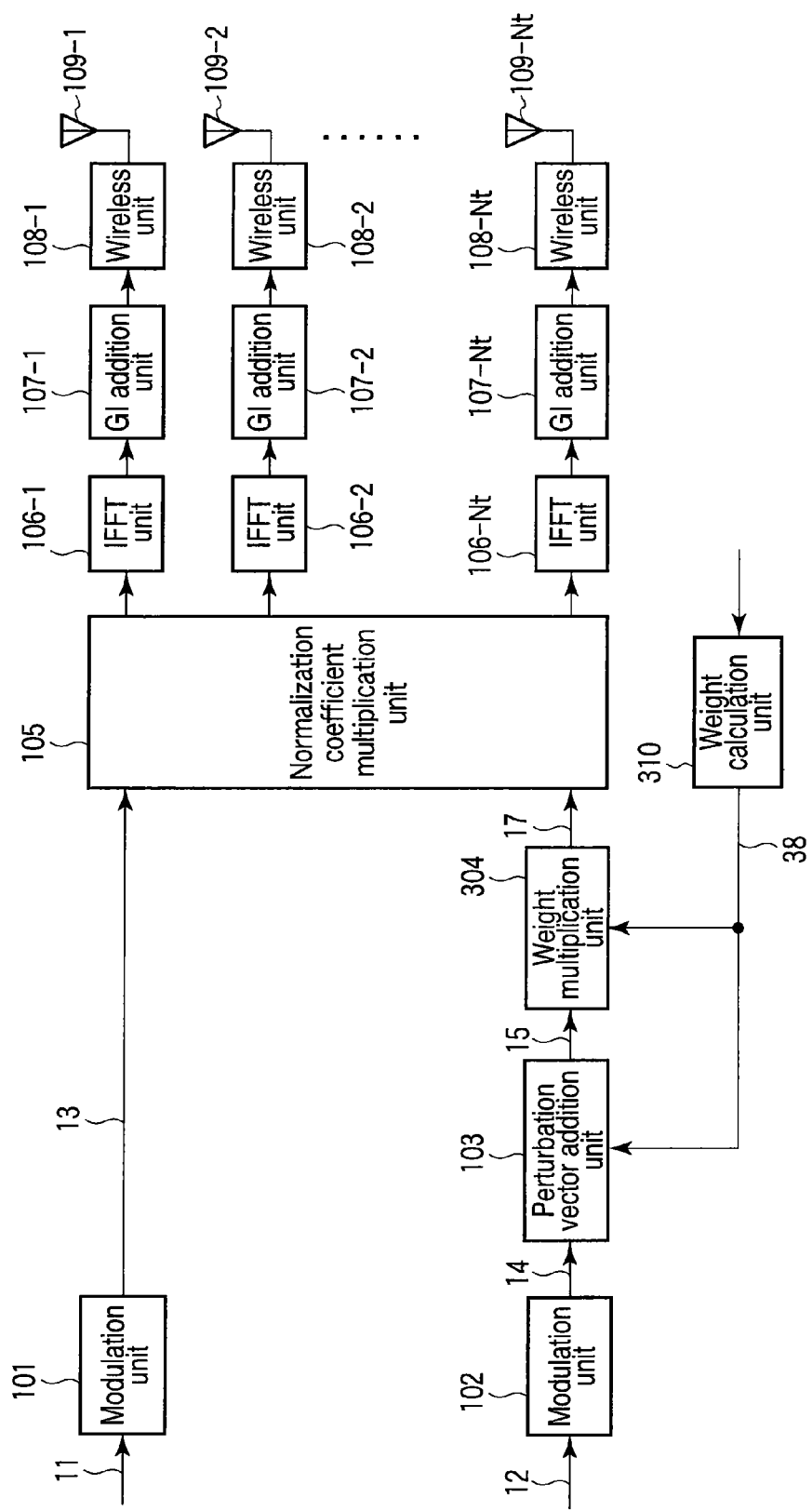
F I G. 5

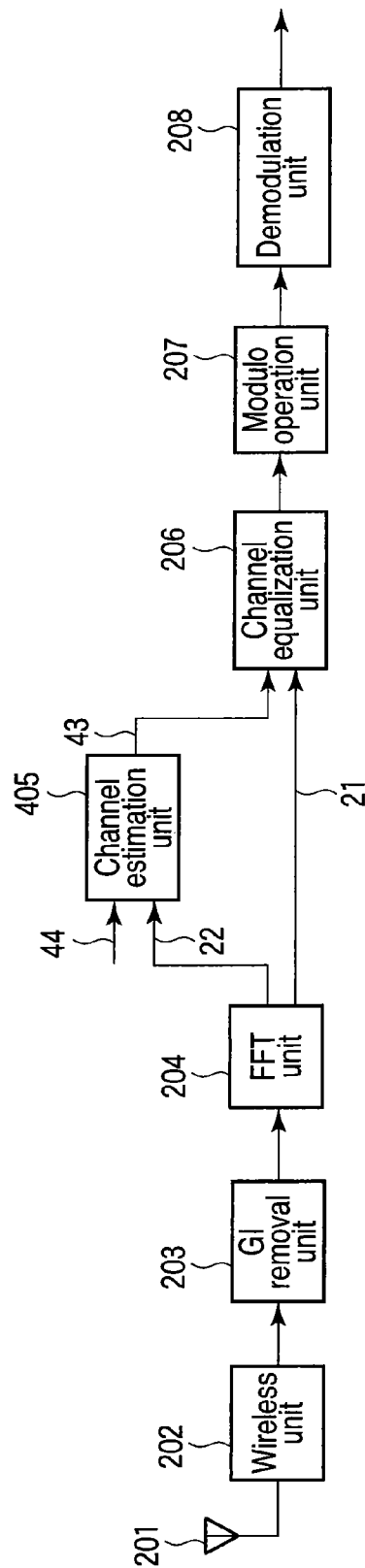
F I G. 6

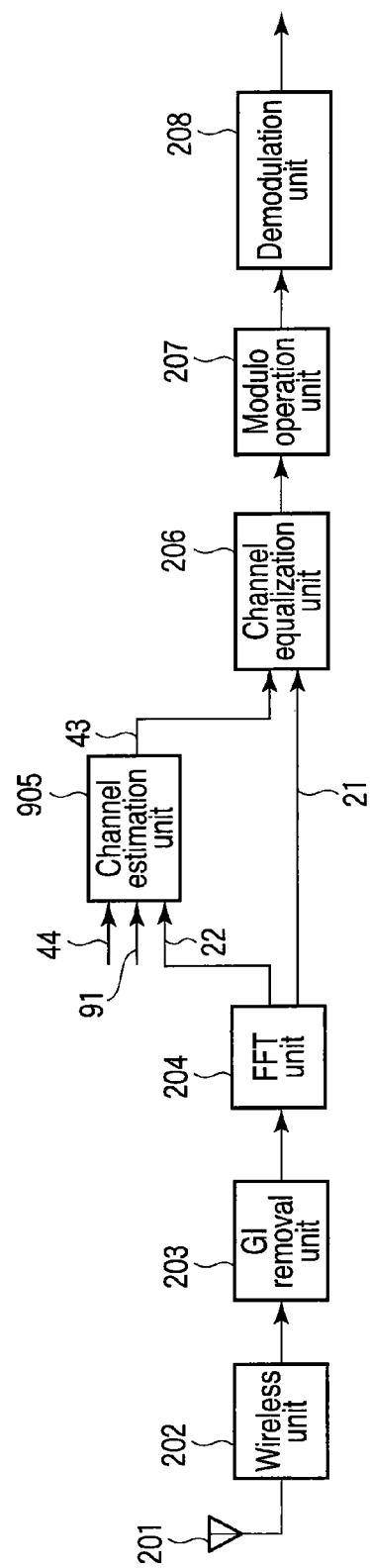
F I G. 9

WIRELESS COMMUNICATION APPARATUS AND METHOD

CROSS-REFERENCE TO RELATED APPLICATIONS

This is a Continuation Application of PCT Application No. PCT/JP2009/068721, filed Oct. 30, 2009, which was published under PCT Article 21(2) in Japanese.

This application is based upon and claims the benefit of priority from Japanese Patent Application No. 2008-284745, filed Nov. 5, 2008; the entire contents of which are incorporated herein by reference.

FIELD

Embodiments described herein relate generally to a wireless communication apparatus and a method.

BACKGROUND

Conventionally, there is known an SDMA (Spatial Division Multiple Access) scheme which spatially multiplexes a plurality of users using a plurality of transmission antennas on the same frequency band at the same time. If the SDMA scheme is applied to a wireless communication system in which a base station and a plurality of user terminals (wireless communication apparatuses capable of, at least, receiving a wireless signal) communicate with each other, communication is possible without spatial interference between the users.

As an SDMA scheme, various embodied schemes have been proposed. In a ZF (Zero-Forcing) scheme, for example, communication is performed without interference between users by generating a matrix (to be referred to as a channel matrix hereinafter) having, as its elements, channel coefficients indicating propagation channel states between a plurality of transmission antennas of a base station and the reception antennas of a plurality of user terminals, and multiplying a transmission signal (user signal) by the pseudo-inverse matrix of the channel matrix as a weight. If the above weight multiplication process is performed when the spatial correlation for the channel matrix is high, the signal level of the transmission signal increases. In the ZF scheme, therefore, the transmission signal is additionally multiplied by a normalization coefficient so that its transmission power does not exceed a rated transmission power. In the ZF scheme, since the above normalization coefficient multiplication process causes a power loss of the transmission signal, noise enhancement occurs upon performing channel equalization for a reception signal in a wireless communication apparatus on the reception side, thereby deteriorating a reception performance. Note that noise enhancement becomes larger as the inverse number of the normalization coefficient increases.

In a VP (Vector Perturbation) scheme described in B. Hochwald, C. Peel, A. Swindlehurst, "A Vector-Perturbation Technique for Near-Capacity Multiantenna Multiuser Communication—PartII: Perturbation," IEEE Trans. on Communications, Vol. 53, No. 3, pp. 537-544, March 2005 (hereinafter referred to as the "reference 1") and C. Windpassinger, R. Fischer, and J. Huber, "Lattice-Reduction Aided Broadcast Precoding," IEEE Trans. on Communications, Vol. 52, No. 12, pp. 2057-2060, December 2004 (hereinafter referred to as the "reference 2"), a so-called perturbation vector which can extend the signal point of a transmission signal is used. The VP scheme searches for a perturbation vector which shifts a transmission signal to an extended signal point such that the inverse number of the normalization coefficient is minimized, adds the searched perturbation vector to the transmission signal, and performs weight multiplication and normalization coefficient multiplication. A wireless communication apparatus on the reception side can reconstruct the transmission signal before the perturbation vector is added, by removing the perturbation vector from a received signal using a modulo operation. Even in the VP scheme, noise enhancement occurs like the ZF scheme. Since, however, the inverse number of the normalization coefficient is small as compared with the ZF scheme, it is possible to suppress deterioration of a reception performance.

Conventionally, a transmission signal in a wireless communication system contains a pilot signal for channel estimation in addition to a data signal as a substantial reception target. The same transmission scheme is generally applied to the data signal and pilot signal. For example, if the data signal is multiplied by a weight, a received data signal has been multiplied by the weight in addition to the channel coefficient of a propagation channel. This requires a wireless communication apparatus on the reception side to estimate not only the channel coefficient but also an effective channel considering the weight. A wireless communication apparatus on the transmission side, therefore, needs to multiply the pilot signal by the weight so that the wireless communication apparatus on the reception side can estimate the effective channel.

In terms of a reception performance, it is not always preferable to simply apply the same transmission scheme to the data signal and pilot signal in wireless communication using a perturbation vector like the above-mentioned VP scheme. As described above, since the wireless communication apparatus on the reception side uses the pilot signal for channel estimation, the pilot signal has a value known to the wireless communication apparatus. Since, however, a perturbation vector has a value unknown to the wireless communication apparatus on the reception side, the wireless communication apparatus cannot estimate a correct effective channel if the perturbation vector is added to the pilot signal. Furthermore, since the value of a searched perturbation vector varies depending on an addition target signal, perturbation vectors which are respectively added to the data signal and pilot signal are not always the same. Therefore, normalization coefficients which are respectively calculated for the data signal and pilot signal are not always the same.

References such as references 1 and 2 are based on the premise that parameters such as a perturbation vector (which is added to the data signal) and a normalization coefficient (by which the data signal is multiplied), which are normally unknown to the wireless communication apparatus on the reception side are known, and the wireless communication apparatus can perform ideal channel equalization. That is, the above references do not disclose a particular technique for enabling to actually perform wireless communication using a perturbation vector, for example, a practical estimation technique for an effective channel.

BRIEF DESCRIPTION OF THE DRAWINGS

FIG. 2 is a block diagram showing a wireless communication apparatus which can receive a transmission signal from the wireless communication apparatus of FIG. 1.

FIG. 4 is a view showing a signal structure example of the data signal and pilot signal in the transmission signal from the wireless communication apparatus of FIG. 1.

FIG. 5 is a block diagram showing a wireless communication apparatus according to the second embodiment.

FIG. 6 is a block diagram showing a wireless communication apparatus which can receive a transmission signal from the wireless communication apparatus of FIG. 5.

FIG. 9 is a block diagram showing a wireless communication apparatus which can receive a transmission signal from the wireless communication apparatus of FIG. 8.

DETAILED DESCRIPTION

Embodiments will be described below with reference to the accompanying drawings.

In general, according to one embodiment, a wireless communication apparatus includes a perturbation vector addition unit, a weight multiplication unit, a normalization coefficient multiplication unit and a transmission unit. The perturbation vector addition unit is configured to add a perturbation vector only to a first data signal of a first transmission signal containing a first pilot signal and the first data signal, and obtain a second transmission signal containing a second pilot signal and a second data signal. The weight multiplication unit is configured to multiply each of the second pilot signal and the second data signal of the second transmission signal by a weight for removing interference on a reception side, and obtain a third transmission signal containing a third pilot signal and a third data signal. The normalization coefficient multiplication unit is configured to multiply each of the third pilot signal and the third data signal of the third transmission signal by a common normalization coefficient for normalizing a total transmission power, and obtain a fourth transmission signal containing a fourth pilot signal and a fourth data signal. The transmission unit is configured to transmit the fourth transmission signal.

First Embodiment

Figure 1:
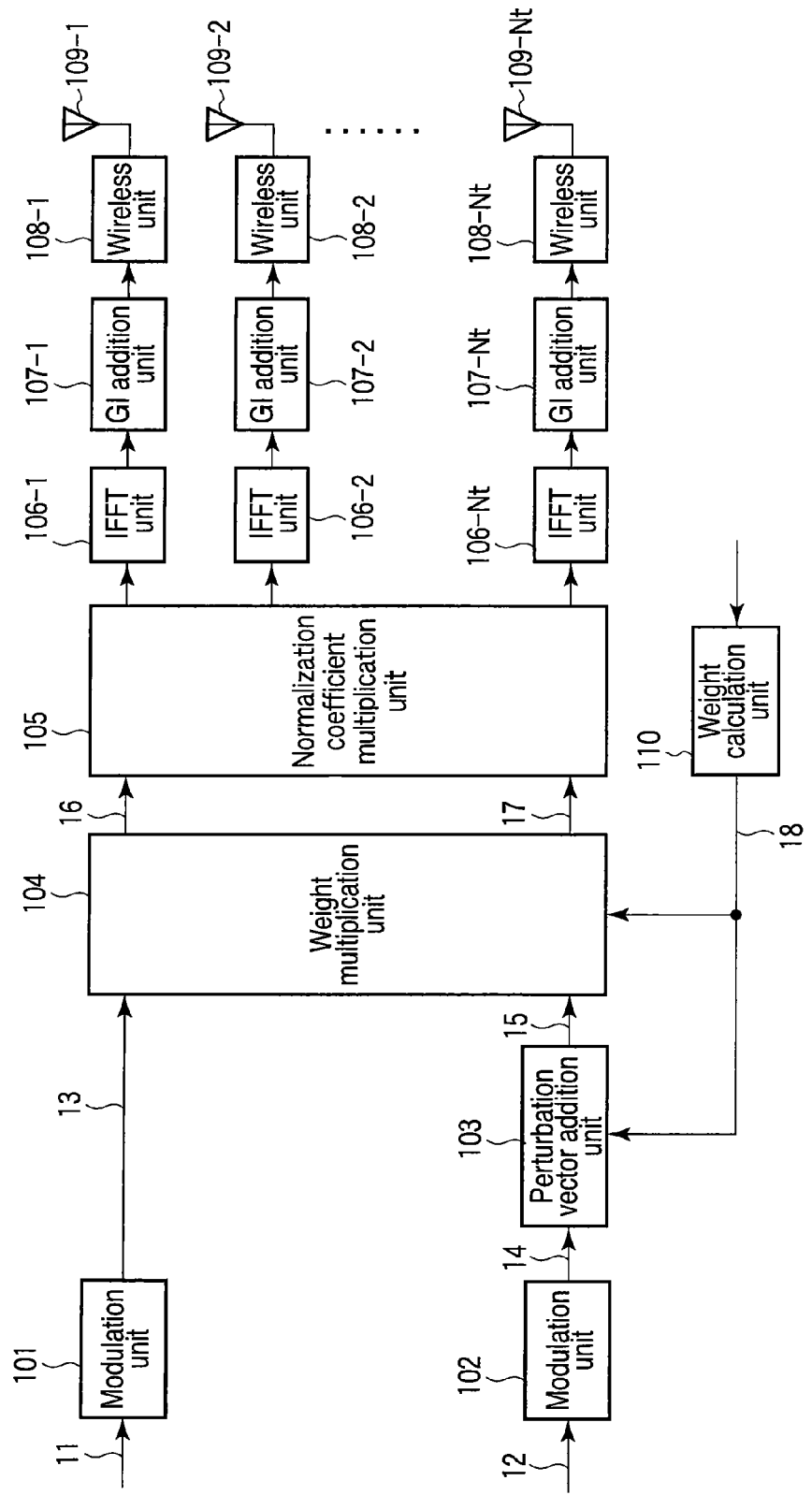
FIG. 1 is a block diagram showing a wireless communication apparatus according to the first embodiment.

As shown in FIG. 1, a wireless communication apparatus according to the first embodiment includes a modulation unit 101, a modulation unit 102, a perturbation vector addition unit 103, a weight multiplication unit 104, a normalization coefficient multiplication unit 105, Nt (assume that Nt is an integer indicating the number of transmission antennas in the following description) inverse fast Fourier transform (IFFT) units 106-1, ..., 106-Nt, GI (Guard Interval) addition units 107-1, ..., 107-Nt, Nt wireless units 108-1, ..., 108-Nt, and Nt antennas 109-1, ..., 109-Nt. It is possible to use the wireless communication apparatus of FIG. 1 as, for example, a base station. The wireless communication apparatus of FIG. 1 uses the SDMA scheme which spatially multiplexes a plurality of user terminals using the Nt antennas 109-1, ..., 109-Nt on the same frequency band at the same time.

The modulation unit 101 performs predetermined modulation processing for a pilot sequence 11 to generate a pilot signal 13 as a modulated symbol. The modulation unit 101 inputs the pilot signal 13 to the weight multiplication unit 104. Note that the above modulation scheme is such that a wireless communication apparatus which communicates with the wireless communication apparatus of FIG. 1 can perform demodulation. The modulation unit 101 can use a PSK (Phase Shift Keying) scheme represented by BPSK (Binary Phase Shift Keying) and QPSK (Quadrature Phase Shift Keying), or a QAM (Quadrature Amplitude Modulation) scheme represented by 16 QAM, 64 QAM, and 256 QAM.

The modulation unit 102 performs modulation processing similar to the modulation unit 101 for a data sequence 12 encoded by an encoding unit (not shown) to generate a data signal 14 as a modulated symbol. The modulation unit 102 inputs the data signal 14 to the perturbation vector addition unit 103.

Based on the data signal 14 from the modulation unit 102 and a weight matrix 18 from a weight calculation unit 110, the perturbation vector addition unit 103 searches for a perturbation vector suitable for the data signal 14 according to a predetermined standard. The perturbation vector will be described in detail later. The perturbation vector addition unit 103 adds the searched perturbation vector to the data signal 14, and inputs, to the weight multiplication unit 104, a data signal 15 to which the perturbation vector has been added.

The weight multiplication unit 104 multiplies each of the pilot signal 13 from the modulation unit 101 and the data signal 15 from the perturbation vector addition unit 103 by the weight matrix 18 from the weight calculation unit 110. The weight multiplication unit 104 inputs, to the normalization coefficient multiplication unit 105, a pilot signal 16 and a data signal 17 both of which have undergone the weight multiplication.

The normalization coefficient multiplication unit 105 multiplies each of the pilot signal 16 and data signal 17 from the weight multiplication unit 104 by a normalization coefficient which makes a total transmission power not larger than a prescribed value. A technique of deriving the normalization coefficient will be explained later. The normalization coefficient multiplication unit 105 inputs, to the respective IFFT units 106-1, ..., 106-Nt, the pilot signal and data signal both of which have undergone the normalization coefficient multiplication.

Each of the IFFT units 106-1, ..., 106-Nt performs IFFT for the pilot signal and/or data signal from the normalization coefficient multiplication unit 105 to transform a signal in the frequency domain into that in the time domain. Each of the IFFT units 106-1, ..., 106-Nt inputs the transformed signal to a corresponding one of the GI addition units 107-1, ..., 107-Nt.

Each of the GI addition units 107-1, ..., 107-Nt adds a GI to the signal from a corresponding one of the IFFT units 106-1, ..., 106-Nt. Each of the GI addition units 107-1, ..., 107-Nt inputs, to a corresponding one of the wireless units 108-1, ..., 108-Nt, a signal to which the GI has been added. Note that a GI addition technique used by the GI addition units 107-1, ..., 107-Nt is not particularly limited, and any technique which is available in an OFDM (Orthogonal Frequency Division Multiplexing) scheme or an OFDMA (Orthogonal Frequency Division Multiple Access) scheme may be used, as needed.

The IFFT units 106-1, ..., 106-Nt and the GI addition units 107-1, ..., 107-Nt are not essential components. That is, when the wireless communication apparatus of FIG. 1 performs multicarrier transmission such as OFDM or OFDMA, the IFFT units 106-1, ..., 106-Nt and the GI addition units 107-1, ..., 107-Nt are necessary. In the case of single carrier transmission, however, the IFFT units 106-1, ..., 106-Nt and the GI addition units 107-1, ..., 107-Nt are not needed. When the wireless communication apparatus of FIG. 1 performs single carrier transmission, the pilot signal and data signal from the normalization coefficient multiplication unit 105 are directly input to the respective wireless units 108-1, ..., 108-Nt. Regardless of whether the wireless communication apparatus of FIG. 1 performs multicarrier transmission or single carrier transmission, a digital filter for bandwidth limiting may be provided before the wireless units 108-1, ..., 108-Nt.

Each of the wireless units 108-1, ..., 108-Nt performs, for an input signal, signal processing corresponding to the transmission processing. That is, each of the wireless units 108-1, ..., 108-Nt performs, for the input signal, signal processing such as digital-to-analog conversion (DA conversion) by a digital-to-analog converter (DAC), up-conversion by a frequency converter, and power amplification by a power amplifier. Each of the wireless units 108-1, ..., 108-Nt inputs a wireless signal that has undergone the above signal processing to a corresponding one of the antennas 109-1, ..., 109-Nt.

Each of the antennas 109-1, ..., 109-Nt radiates the wireless signal from a corresponding one of the wireless units 108-1, ..., 108-Nt into the space. Each of the antennas 109-1, ..., 109-Nt is not limited to a particular antenna, and may be any antenna which can transmit the wireless signal on a desired frequency band.

The weight calculation unit 110 calculates the weight matrix 18 based on feedback information from a user terminal, that is, a wireless communication apparatus on the reception side. The weight calculation unit 110 inputs the weight matrix 18 to the perturbation vector addition unit 103 and weight multiplication unit 104. A technique of calculating the weight matrix 18 by the weight calculation unit 110 may be selected based on the feedback information, as needed. If, for example, the above feedback information indicates a channel response between the wireless communication apparatus of FIG. 1 and that on the reception side, the weight calculation unit 110 can calculate the weight matrix 18 according to the ZF standard, the MMSE (Minimum Mean Square Error) standard, or the like. If the above feedback information indicates an index for a weight selected from a codebook previously shared between the wireless communication apparatus of FIG. 1 and that on the reception side, the weight calculation unit 110 can calculate the weight matrix 18 by referring to the codebook using the index. Note that the codebook may include weight vectors having an orthogonal relationship, or those having a non-orthogonal relationship.

A wireless communication apparatus which receives a transmission signal from the wireless communication apparatus of FIG. 1 includes an antenna 201, a wireless unit 202, a GI removal unit 203, a fast Fourier transform (FFT) unit 204, a channel estimation unit 205, a channel equalization unit 206, a modulo operation unit 207, and a demodulation unit 208, as shown in FIG. 2. The wireless communication apparatus of FIG. 2 can be used as, for example, a user terminal which communicates with a base station.

The antenna 201 receives a wireless signal transmitted from the wireless communication apparatus of FIG. 1. The antenna 201 inputs the received signal to the wireless unit 202. Note that the antenna 201 is not limited to a particular antenna, and may be any antenna which can receive a wireless signal on a desired frequency band.

The wireless unit 202 performs, for the signal received from the antenna 201, signal processing corresponding to the reception processing. That is, the wireless unit 202 performs, for the received signal, amplification of a signal level by an LNA (Low Noise Amplifier), down-conversion by a frequency converter, analog-to-digital conversion (AD conversion) by an analog-to-digital converter (ADC), band limiting by a filter, and the like. The wireless unit 202 inputs a baseband signal that has undergone the signal processing to the GI removal unit 203.

The GI removal unit 203 removes a GI from the signal input by the wireless unit 202. The GI removal unit 203 inputs a signal that has undergone the GI removal to the FFT unit 204. A GI removal technique used by the GI removal unit 203 is not particularly limited, and any technique available in the OFDM or OFDMA scheme may be used, as needed.

The FFT unit 204 performs FFT for the signal from the GI removal unit 203 to transform a signal in the time domain into that in the frequency domain. That is, the FFT unit 204 separates the received signal for each subcarrier. The FFT unit 204 inputs a data signal 21 of the signal that has undergone FFT to the channel equalization unit 206, and inputs a pilot signal 22 of the signal that has undergone FFT to the channel estimation unit 205.

The GI removal unit 203 and FFT unit 204 are not essential components. That is, if the wireless communication apparatus of FIG. 1 performs multicarrier transmission such as OFDM or OFDMA, the GI removal unit 203 and FFT unit 204 are necessary. In the case of single carrier transmission, however, they are not needed. If the wireless communication apparatus of FIG. 1 performs single carrier transmission, the data signal 21 of the signal from the wireless unit 202 may be directly input to the channel equalization unit 206, and the pilot signal 22 of the signal from the wireless unit 202 may be directly input to the channel estimation unit 205. Regardless of whether the wireless communication apparatus of FIG. 1 performs multicarrier transmission or single carrier transmission, a digital filter for band limiting after the wireless unit 202 may be provided.

The channel estimation unit 205 estimates an effective channel using the input pilot signal 22 and a pilot signal value known to the wireless communication apparatus of FIG. 2. The channel estimation unit 205 inputs an estimated effective channel 23 to the channel equalization unit 206.

The channel equalization unit 206 performs channel equalization for the input data signal using the estimated effective channel 23 from the channel estimation unit 205. The channel equalization unit 206 inputs the data signal that has undergone the channel equalization to the modulo operation unit 207.

The modulo operation unit 207 performs a predetermined modulo operation for the data signal from the channel equalization unit 206 to remove a perturbation vector added to the data signal. That is, the modulo operation unit 207 reconstructs the data signal 14 before the perturbation vector is added by the perturbation vector addition unit 103. The modulo operation unit 207 inputs the data signal that has undergone the modulo operation to the demodulation unit 208.

The demodulation unit 208 performs predetermined demodulation processing for the data signal from the modulo operation unit 207 to generate a demodulated data sequence. The demodulation processing corresponds to the modulation processing performed by the modulation unit 102 in the wireless communication apparatus of FIG. 1. A decoding unit (not shown) performs decoding processing corresponding to the encoding processing performed by the wireless communication apparatus of FIG. 1 for the demodulated data sequence generated by the demodulation unit 208.

Before explaining the technical significance of the wireless communication apparatus according to this embodiment, an outline of the ZF and VP schemes as conventional techniques and their problems will be described. In a description of the VP scheme, a perturbation vector will be explained in detail. In the following description, for the sake of simplification, assume that wireless communication according to the SDMA scheme is performed between a base station and users 1 and 2.

The base station includes two transmission antennas, Tx1 and Tx2. The terminal of user 1 includes one reception antenna Rx1 and the terminal of user 2 includes one reception antenna Rx2. The base station transmits, to users 1 and 2, a user signal s (which can contain a pilot signal and data signal) given by $$s = \begin{bmatrix} s_1 \\ s_2 \end{bmatrix} \quad (1)$$

where $s_1$ represents a user signal destined to user 1, and $s_2$ represents a user signal destined to user 2. When the reception antennas Rx1 and Rx2 respectively receive the user signal s, a noise signal n represented by expression (2) is superposed on the user signal s.

$$n = \begin{bmatrix} n_1 \\ n_2 \end{bmatrix} \quad (2)$$

where $n_1$ represents a noise signal received by the reception antenna Rx1, and $n_2$ represents a noise signal received by the reception antenna Rx2. According to expressions (1) and (2), when the reception antennas Rx1 and Rx2 respectively receive the user signal s transmitted from the base station, it is possible to obtain a received signal given by $$\begin{aligned} y &= Hs + n \\ &= \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} \end{aligned} \quad (3)$$

where H represents a channel matrix between the base station and the terminals of users 1 and 2, $h_{11}$ represents a channel response between the transmission antenna Tx1 and the reception antenna Rx1, $h_{12}$ represents a channel response between the transmission antenna Tx2 and the reception antenna Rx1, $h_{21}$ represents a channel response between the transmission antenna Tx1 and the reception antenna Rx2, and $h_{22}$ represents a channel response between the transmission antenna Tx2 and the reception antenna Rx2. According to expression (3), interference occurs in the received signal of the reception antenna Rx1 due to the user signal $s_2$ destined to user 2, and in the received signal of the reception antenna Rx2 due to the user signal $s_1$ destined to user 1. In order to cancel the interference, the base station multiplies the user signal s by a weight matrix W represented by expression (4) in advance.

$$W = H^+ = H^H (HH^H)^{-1} \quad (4)$$

where $H^+$ represents the pseudo-inverse matrix of the channel matrix H, and $H^H$ represents the complex conjugate transpose matrix of the channel matrix H. If the spatial correlation in the channel matrix H is high, a transmission power increases due to the weight matrix multiplication. In the ZF scheme, therefore, the base station generates a transmission signal x by multiplying by a normalization coefficient $1/\sqrt{\gamma}$ as in expression (5) the user signal s which has been multiplied by the weight matrix W such that the transmission power does not exceed a rated transmission power.

$$x = \frac{1}{\sqrt{\gamma}} W s \quad (5)$$

For example, γ in expression (5) can be calculated by $$\gamma = \|Ws\|^2 \quad (6)$$

Normalization using γ represented by expression (6) is done so that the total transmission power of the transmission signal x becomes 1. If each of the reception antennas Rx1 and Rx2 receives the transmission signal x represented by expression (5), it is possible to obtain a received signal y given by $$\begin{aligned} y &= \frac{1}{\sqrt{\gamma}} HWs + n \\ &= \frac{1}{\sqrt{\gamma}} HH^H(HH^H)^{-1} s + n \\ &= \frac{1}{\sqrt{\gamma}} s + n \\ &= \frac{1}{\sqrt{\gamma}} \begin{bmatrix} s_1 \\ s_2 \end{bmatrix} + \begin{bmatrix} n_1 \\ n_2 \end{bmatrix} \end{aligned} \quad (7)$$

According to expression (7), since the user signal s (that is, the signals $s_1$ and $s_2$) is multiplied by an effective channel ($=1/\sqrt{\gamma}$), each of the terminals of users 1 and 2 performs channel estimation using a pilot signal. Each of the terminals of users 1 and 2 performs channel equalization of the received signal y using an estimated effective channel Heff, and obtains a received signal y' that has undergone the channel equalization, which is given by $$\begin{aligned} y' &= \frac{y}{H_{\mathit{eff}}} \\ &= \begin{bmatrix} s_1 \\ s_2 \end{bmatrix} + \sqrt{\gamma} \begin{bmatrix} n_1 \\ n_2 \end{bmatrix} \end{aligned} \quad (8)$$

According to expression (8), the terminals of users 1 and 2 can receive the user signal $s_1$ destined to user 1 and the user signal $s_2$ destined to user 2 without interfering with each other, respectively. The terminals of users 1 and 2 receive noise components $n_1$ and $n_2$ both of which have been enhanced by a factor of $\sqrt{\gamma}$ (that is, a factor of the inverse number of the normalization coefficient), respectively. In the ZF scheme, therefore, as the normalization coefficient $1/\sqrt{\gamma}$ is smaller, the noise components $n_1$ and $n_2$ are enhanced, thereby deteriorating the reception performances of the terminals of users 1 and 2.

The VP scheme (especially, the VP scheme according to reference 1) is very different from the ZF scheme in that the transmission signal x is generated by adding a perturbation vector d to the user signal s as indicated by $$x = \frac{1}{\sqrt{\gamma}} W(s + d) \quad (9)$$

According to expression (9), γ for making the total transmission power of the transmission signal x become 1 can be calculated by $$\gamma = \|W(s+d)\|^2 \quad (10)$$

The VP scheme has as its object to search for a perturbation vector d, in an extended constellation ($\tau Z^2$), such that γ represented by expression (10) is minimized according to a standard given by $$d = \underset{\tilde{d}\in\tau CZ^m}{\mathrm{argmin}} \|W(s+\tilde{d})\|^2 \quad (11)$$

where τ represents the perturbation interval (positive number), and is set according to a multi-valued number of the modulation scheme performed for the user signal s. In reference 1, for example, τ=4 is set for QPSK and τ=8 is set for 16 QAM. The value of τ is not limited to them, and any positive value may be set by an operator. In expression (11), $CZ^m$ represents an m-dimensional vector with both the real part component and the imaginary part component of it being integers. To search for a perturbation vector d, any of various search techniques such as the Sphere Encoding scheme described in reference 1 and the LLL algorithm described in reference 2 may be used.

Let $d_1$ and $d_2$ be the components of the perturbation vector d. In this case, each of the reception antennas Rx1 and Rx2 obtains a received signal y given by $$y = \frac{1}{\sqrt{\gamma}} HW(s+d) + n \quad (12)$$
$$= \frac{1}{\sqrt{\gamma}} HH^H(HH^H)^{-1}(s+d) + n$$
$$= \frac{1}{\sqrt{\gamma}} (s+d) + n$$
$$= \frac{1}{\sqrt{\gamma}} \begin{bmatrix} s_1+d_1 \\ s_2+d_2 \end{bmatrix} + \begin{bmatrix} n_1 \\ n_2 \end{bmatrix}$$

Assume that each of the terminals of users 1 and 2 can perform ideal channel equalization for the received signal y represented by expression (12). In this case, it is possible to obtain, by the channel equalization, a received signal y' given by $$y' = \begin{bmatrix} s_1+d_1 \\ s_2+d_2 \end{bmatrix} + \sqrt{\gamma} \begin{bmatrix} n_1 \\ n_2 \end{bmatrix} \quad (13)$$

If a noise signal is ignored in expression (13), the terminal of user 1 receives a composite signal of the user signal $s_1$ destined to user 1 and a perturbation vector $d_1$ added to the user signal $s_1$ by the base station. The terminal of user 2 receives a composite signal of the user signal $s_2$ destined to user 2 and a perturbation vector $d_2$ added to the user signal $s_2$ by the base station. That is, the received signal of the terminal of user 1 is obtained by shifting the signal point of the user signal $s_1$ destined to user 1 by the perturbation vector $d_1$, and the received signal of the terminal of user 2 is obtained by shifting the signal point of the user signal $s_2$ destined to user 2 by the perturbation vector $d_2$. Each of the terminals of users 1 and 2 applies a modulo operation represented by expression (14) to its received signal to remove the perturbation vector $d_1$ and $d_2$.

$$f_\tau(z) = z - \tau \left\lfloor \frac{z + \frac{\tau}{2}}{\tau} \right\rfloor \quad (14)$$

Applying the modulo operation represented by expression (14) to the received signal y' represented by expression (13) yields a received signal y" given by $$y'' = f_\tau(y') = \begin{bmatrix} s_1 \\ s_2 \end{bmatrix} + f_\tau\left(\sqrt{\gamma}\begin{bmatrix} n_1 \\ n_2 \end{bmatrix}\right) \quad (15)$$

According to expression (15), as a result of the modulo operation represented by expression (14), the perturbation vectors $d_1$ and $d_2$ are removed, thereby generating the received signal y" similar to the received signal y' represented by expression (8). The substantial difference between the received signal y' represented by expression (8) and the received signal y" represented by expression (15) is a value of γ. As described above, since the VP scheme searches for a perturbation vector d such that γ is minimized, γ in expression (15) does not exceed that in expression (8). That is, according to the VP scheme, it is possible to suppress noise enhancement as compared with the ZF scheme.

Problems with the conventional VP scheme will be described below.

The conventional VP scheme assumes that each of the terminals of users 1 and 2 can perform ideal channel equalization. If, however, the base station adds perturbation vectors to the pilot signal and the data signal respectively, performs weight multiplication and normalization coefficient multiplication, and then generates a transmission signal, the terminals of users 1 and 2 do not know the perturbation vector added to the pilot signal, and thus cannot estimate a correct effective channel. Let $s_1^p$ be a pilot signal known to the terminal of user 1, and $d_1$ be a perturbation vector added to the pilot signal $s_1^p$. Then, it is possible to represent an effective channel estimated by the terminal of user 1 by $$H_{\mathit{eff}} = \frac{\frac{1}{\sqrt{\gamma}}(s_1^p + d_1)}{s_1^p} = \frac{1}{\sqrt{\gamma}}\left(1 + \frac{d_1}{s_1^p}\right) \quad (16)$$

An estimated effective channel Heff represented by expression (16) is different from the actual effective channel $1/\sqrt{\gamma}$. Therefore, even if channel equalization is performed using the estimated effective channel Heff, a good reception performance cannot be expected.

As the technical significance of the wireless communication apparatus according to this embodiment, the validity of effective channel estimation for the wireless communication apparatus of FIG. 1 is mainly explained below.

As described above, the pilot signal 13 ($s^p$) is input to the weight multiplication unit 104 without adding a perturbation vector. The data signal 14 ($s^d$) is added, by the perturbation vector addition unit 103, with the perturbation vector ($d^d$)

searched in accordance with, for example, the standard represented by expression (11), and then input to the weight multiplication unit 104.

The weight multiplication unit 104 multiplies each of the input pilot signal 13 ($s^p$) and the data signal 15 ($s^d+d^d$) by the weight matrix 18 (W). If the feedback information input to the weight calculation unit 110 indicates a channel response, the weight matrix W may be calculated based on the ZF standard represented by expression (4), or the MMSE standard given by $$W = H^H(HH^H + \alpha I)^{-1} \quad (17)$$

The pilot signal 16 ($x^p$) and the data signal 17 ($x^d$) output from the weight multiplication unit 104 are respectively given by $$x^p = W s^p \quad (18)$$

$$x^d = W(s^d + d^d) \quad (19)$$

The normalization coefficient multiplication unit 105 derives a normalization coefficient such that the transmission power is constant, and multiplies each of the pilot signal ($x^p$) and the data signal ($x^d$) by the normalization coefficient.

Figure 3:
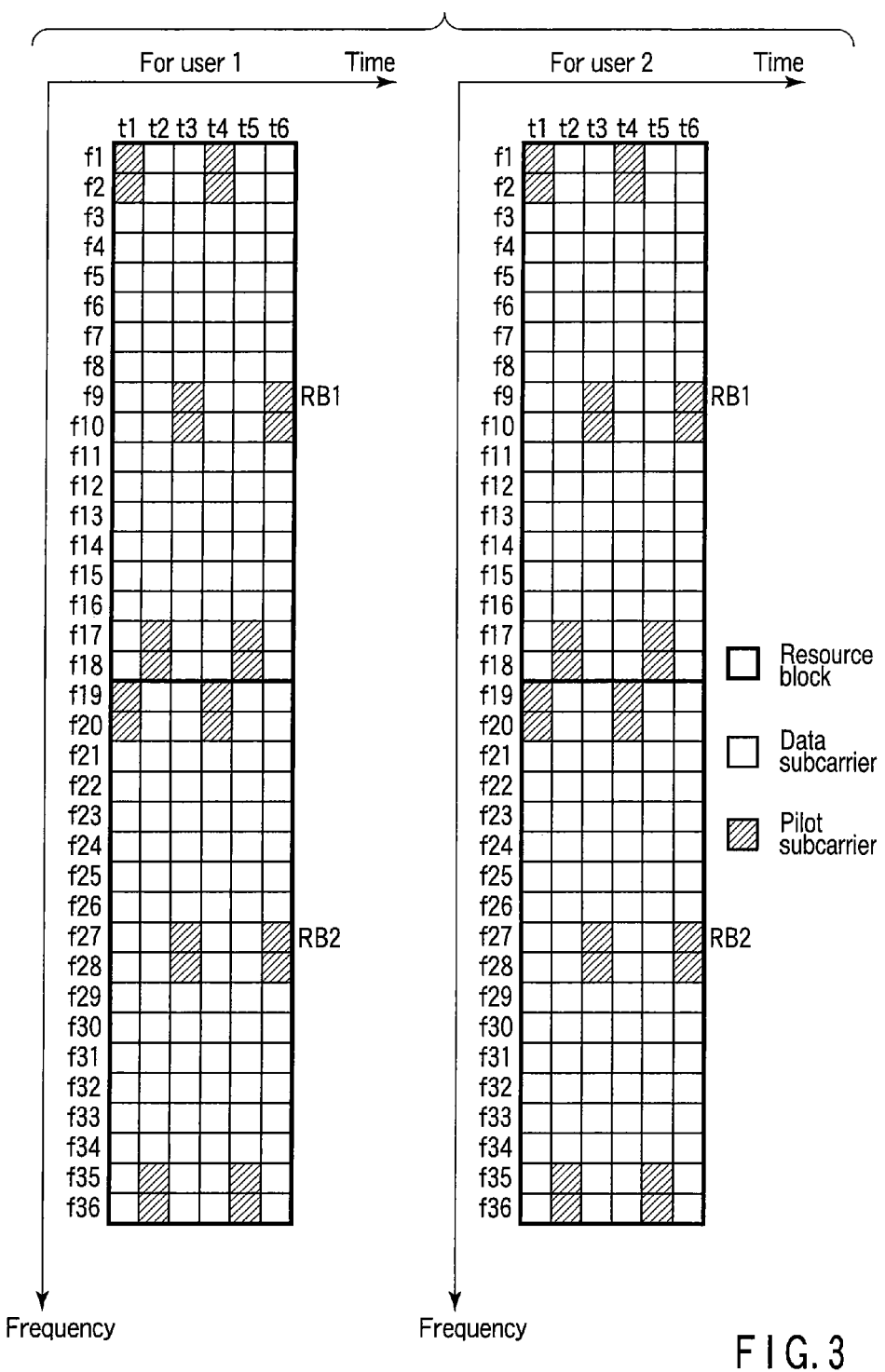
FIG. 3 is a view showing a signal structure example of a data signal and pilot signal in a transmission signal from the wireless communication apparatus of FIG. 1.

Consider a technique of deriving the normalization coefficient. If, for example, the wireless communication apparatus of FIG. 1 uses the OFDMA scheme, a transmission signal shown in FIG. 3 is generated. FIG. 3 shows a structure example of a transmission signal destined to user 1 and that destined to user 2. In FIG. 3, the ordinate indicates frequency (subcarrier) and the abscissa indicates time (OFDM symbol).

The OFDMA scheme multiplexes a plurality of users on the frequency axis by assigning, to a user, some of a plurality of subcarriers obtained by dividing an available frequency band. The OFDM scheme is different from the OFDMA scheme in that a plurality of subcarriers obtained by dividing an available frequency band are all assigned to a user. Referring to FIG. 3, users 1 and 2 are assigned transmission streams spatially different from each other, and commonly assigned the resources of subcarriers f1 to f36 in the frequency direction and OFDM symbols t1 to t6 in the time direction.

The frequency and time resources (in this example, the resources of the subcarriers f1 to f36 in the frequency direction and the OFDM symbols t1 to t6 in the time direction) assigned to each user as described above will be referred to as a burst hereinafter. In each burst, a group of resources (in this example, 18 subcarriers×6 OFDM symbols) as a processing unit in an encoding unit and decoding unit (both are not shown in FIGS. 1 and 2) will be referred to as a resource block (RB). Referring to FIG. 3, the resource block is represented by a thick box. Each of users 1 and 2 is assigned RB1 (the resources of the subcarriers f1 to f18 in the frequency direction and the OFDM symbols t1 to t6 in the time direction) and RB2 (the resources of the subcarriers f19 to f36 in the frequency direction and the OFDM symbols t1 to t6 in the time direction). Furthermore, FIG. 3 shows subcarriers for data signals with white blocks and those for pilot signals with hatched blocks in each OFDM symbol. That is, in the OFDM symbol=t1, the subcarriers f1, f2, f19, and f20 serve as pilot subcarriers, and the subcarriers f3 to f18 and f21 to f36 serve as data subcarriers.

In the transmission signal shown in FIG. 3, for each combination of a subcarrier and OFDM symbol (that is, for each block), the user signal s to be spatially multiplexed is different, and therefore, $\gamma$ to be calculated according to expression (10) is also different. Let $\gamma^p$ be $\gamma$ calculated based on the pilot signal, and $\gamma^d$ be $\gamma$ calculated based on the data signal. In this case, even if normalization coefficient multiplication is performed by discriminating between the pilot signal and data signal, it is impossible to correctly estimate an effective channel on the reception side since $\gamma^p$ is not equal to $\gamma^d$. In order to correctly estimate an effective channel on the reception side, the wireless communication apparatus according to this embodiment generates a transmission signal by deriving a normalization coefficient common to the pilot signal and data signal, and multiplying the normalization coefficient.

There will be exemplified below five concrete techniques of deriving the above common normalization coefficient when the wireless communication apparatus of FIG. 1 performs multicarrier transmission. The technique of deriving the above common normalization coefficient is not limited to them, as a matter of course.

(First Deriving Technique)

The first deriving technique derives, as a normalization coefficient by which each of pilot signals and data signals in each resource block is to be multiplied, an average value of normalization coefficients respectively calculated for the pilot signals and data signals in the corresponding resource block. When applying the first deriving technique to the transmission signal shown in FIG. 3, each of the pilot signals and data signals in RB1 is multiplied by an average value of normalization coefficients respectively calculated for 6×18=108 signals contained in RB1 (the OFDM symbols t1 to t6 and the subcarriers f1 to f18).

(Second Deriving Technique)

The second deriving technique derives, as a normalization coefficient by which each of pilot signals and data signals in each burst is to be multiplied, an average value of normalization coefficients respectively calculated for the pilot signals and data signals in the corresponding burst. When applying the second deriving technique to the transmission signal shown in FIG. 3, each of the pilot signals and data signals in RB1 and RB2 is multiplied by an average value of normalization coefficients respectively calculated for 6×36=216 signals contained in RB1 and RB2 (the OFDM symbols t1 to t6 and the subcarriers f1 to f36).

(Third Deriving Technique)

The third deriving technique derives, as a normalization coefficient by which each of pilot signals and data signals in each OFDM symbol group obtained by time-dividing a resource block is to be multiplied, an average value of normalization coefficients respectively calculated for the pilot signals and data signals in the corresponding OFDM symbol group. Note that a technique of dividing a resource block is arbitrary. For example, if a resource block containing six OFDM symbols as shown in FIG. 3 is divided, the resource block may be divided into six parts (6 groups×1 OFDM symbol), three parts (3 groups×2 OFDM symbols), or two parts (2 groups×3 OFDM symbols), or may be unequally divided when the reception side knows a division rule. When applying the third deriving technique to the transmission signal shown in FIG. 3, each of the pilot signals and data signals in the OFDM symbol group is multiplied by an average value of normalization coefficients respectively calculated for 3×18=54 signals contained in an OFDM symbol group (the OFDM symbols t1 to t3 and the subcarriers f1 to f18) obtained by dividing RB1 into two parts.

(Fourth Deriving Technique)

The fourth deriving technique derives, as a normalization coefficient by which each of pilot signals and data signals in each OFDM symbol group obtained by time-dividing a burst is to be multiplied, an average value of normalization coefficients respectively calculated for the pilot signals and data signals in the corresponding OFDM symbol group. Note that a technique of dividing a burst is arbitrary. For example, if a burst containing six OFDM symbols as shown in FIG. 3 is divided, the burst may be divided into six parts (6 groups×1 OFDM symbol), three parts (3 groups×2 OFDM symbols), or two parts (2 groups×3 OFDM symbols), or may be unequally divided when the reception side knows a division rule. When applying the fourth deriving technique to the transmission signal shown in FIG. 3, each of the pilot signals and data signals in the OFDM symbol group is multiplied by an average value of normalization coefficients respectively calculated for 3×36=108 signals contained in an OFDM symbol group (the OFDM symbols t1 to t3 and the subcarriers f1 to f36) obtained by dividing the burst into two parts.

(Fifth Deriving Technique)

The fifth deriving technique derives, as a normalization coefficient by which each of pilot signals and data signals contained in a whole transmission signal (transmission frame) transmitted by the wireless communication apparatus of FIG. 1 is to be multiplied, an average value of normalization coefficients respectively calculated for the pilot signals and data signals within the frame. The subcarriers f1 to f36 are assigned to users 1 and 2 in FIG. 3. Since the OFDMA scheme can multiplex users on the frequency axis, however, the wireless communication apparatus of FIG. 1 can assign subcarriers f37 to f72 different from those f1 to f36 to other users 3 and 4 different from those 1 and 2. In this case, each of the pilot signals and data signals within the frame is multiplied by an average value of normalization coefficients respectively calculated for 6×72=432 signals contained in the whole frame (the OFDM symbols t1 to t6 and the subcarriers f1 to f72).

When the wireless communication apparatus of FIG. 1 performs single carrier transmission, a transmission signal is designed as shown in, for example, FIG. 4. FIG. 4 shows a structure example of a transmission signal destined to user 1 and that destined to user 2. In FIG. 4, the ordinate indicates frequency (carrier) and the abscissa indicates time (symbol). Referring to FIG. 4, users 1 and 2 are assigned transmission streams spatially different from each other, and commonly assigned the resources of a carrier f1 in the frequency direction and symbols t1 to t30 in the time direction. Furthermore, FIG. 4 shows symbols for data signals with white blocks and those for pilot signals with hatched blocks. That is, the symbols t1, t2, t11, t12, t21, and t22 represent pilot signals, and the symbols t3 to t10, t13 to t20, and t23 to t30 represent data signals.

If the transmission signal has the structure for single carrier transmission as shown in FIG. 4, an average value of normalization coefficients respectively calculated for the pilot signals and data signals contained in all the symbols (t1 to t30) may be derived as a normalization coefficient by which each of the pilot signals and data signals contained in all the symbols is to be multiplied. An average value of normalization coefficients respectively calculated for the pilot signals and data signals in each symbol group (for example, t1 to t10, t11 to t20, or t21 to t30) obtained by time-dividing all the symbols (t1 to t30) may be derived as a normalization coefficient by which each of the pilot signals and data signals in the corresponding symbol group is to be multiplied.

When the normalization coefficient multiplication unit 105 multiplies a pilot signal and a data signal by the thus derived common normalization coefficient ($1/\sqrt{\gamma_{avg}}$), each of the terminals of users 1 and 2 can obtain a pilot signal $y^p$ represented by expression (20) and a data signal $y^d$ represented by expression (21). For the sake of simplification, expression (20) or (21) excludes a noise signal.

$$y^p = \frac{1}{\sqrt{\gamma_{avg}}} s^p \quad (20)$$

$$y^d = \frac{1}{\sqrt{\gamma_{avg}}} (s^d + d^d) \quad (21)$$

Since the value of a pilot signal $s^p$ is known, each of the terminals of users 1 and 2 can correctly estimate the effective channel $1/\sqrt{\gamma_{avg}}$ by dividing, by the known value, the pilot signal $y^p$ represented by expression (20). By performing channel equalization for the data signal yd represented by expression (21) using the estimated effective channel Heff, therefore, each of the terminals of users 1 and 2 can obtain a data signal $y'^d$ given by $$y'^d = \frac{y^d}{H_{eff}} = s^d + d^d \quad (22)$$

Each of the terminals of users 1 and 2 can correctly reconstruct a data signal $s^d$ by performing the above-mentioned modulo operation for the data signal $y'^d$ represented by expression (22) to remove the perturbation vector $d^d$.

In the above description, both the number of transmission antennas and that of users are two and one transmission stream is applied to each user. However, the number of transmission antennas may be three or more and two or more transmission streams may be assigned to each user, or the number of users may be three or more. Furthermore, a user terminal may have a plurality of reception antennas. In this case, channel information considering reception filter matrices used by the plurality of reception antennas is fed back to the wireless communication apparatus on the transmission side.

As described above, the wireless communication apparatus according to this embodiment adds a perturbation vector only to a data signal, and multiplies a pilot signal and the data signal by a common normalization coefficient, thereby generating a transmission signal. A wireless communication apparatus on the reception side estimates a correct effective channel based on the known pilot signal value, and performs channel equalization using the effective channel, thereby enabling to correctly reconstruct the data signal added with the perturbation vector. That is, the wireless communication apparatus according to this embodiment can actually perform wireless communication using a perturbation vector.

Second Embodiment

As shown in FIG. 5, a wireless communication apparatus according to the second embodiment includes a weight multiplication unit 304 and a weight calculation unit 310 in place of the weight multiplication unit 104 and the weight calculation unit 110 of the wireless communication apparatus shown in FIG. 1, respectively. In the following description, the same parts in FIG. 5 as those in FIG. 1 have the same reference numerals, and different parts will be mainly explained.

The weight calculation unit 310 receives, as feedback information, an index indicating a weight matrix selected by a wireless communication apparatus on the reception side from a codebook previously shared between the wireless communication apparatus of FIG. 5 and that on the reception side. The weight calculation unit 310 inputs a weight matrix 38 specified by the index in the codebook to a perturbation vector addition unit 103 and the weight multiplication unit 304. In a wireless communication system in which wireless communication according to the SDMA scheme is performed using a weight selected from the codebook, it is possible to notify the wireless communication apparatus on the reception side by storing the index indicating the selected weight (for example, the weight matrix 38) in a field indicating a control signal such as a header field within a frame.

In contrast to the above-described weight multiplication unit 104, the weight multiplication unit 304 performs weight multiplication not for a pilot signal 13 from a modulation unit 101 but for a data signal 15 from the perturbation vector addition unit 103. The weight multiplication unit 304 inputs a data signal 17 that has undergone the weight multiplication process to a normalization coefficient multiplication unit 105. On the other hand, the pilot signal 13 is directly input to the normalization coefficient multiplication unit 105 from the modulation unit 101. That is, the pilot signal 13 ($x^p$) represented by expression (23) and the data signal 17 ($x^d$) represented by expression (24) are input to the normalization coefficient multiplication unit 105.

$$x^p = s^p \tag{23}$$

$$x^d = W(s^d + d^d) \tag{24}$$

The pilot signal 13 ($x^p$) and the data signal 17 ($x^d$) are multiplied by a common normalization coefficient $1/\sqrt{\gamma_{avg}}$ by the normalization coefficient multiplication unit 105 as in the above-described first embodiment, and then transmitted to the wireless communication apparatus on the reception side.

A wireless communication apparatus which receives a transmission signal from the wireless communication apparatus of FIG. 5 includes an antenna 201, a wireless unit 202, a GI removal unit 203, an FFT unit 204, a channel estimation unit 405, a channel equalization unit 206, a modulo operation unit 207, and a demodulation unit 208, as shown in FIG. 6. In the following description, the same parts in FIG. 6 as those in FIG. 2 have the same reference numerals, and different parts will be mainly explained.

Upon reception of the transmission signal represented by expressions (23) and (24), the wireless communication apparatus of FIG. 6 can obtain both a pilot signal $y^p$ represented by expression (25) and a data signal $y^d$ represented by expression (26). For the sake of simplification, expression (25) or (26) excludes a noise signal.

$$y^p = \frac{1}{\sqrt{\gamma_{avg}}} H s^p \tag{25}$$

$$y^d = \frac{1}{\sqrt{\gamma_{avg}}} HW(s^d + d^d) \tag{26}$$

As described above, W in expression (26) represents not a weight matrix obtained by calculating the pseudo-inverse matrix of a channel matrix H represented by expression (4) but a weight matrix selected from a codebook in which a plurality of candidates are defined in advance. That is, HW in expression (26) is not necessarily a unit matrix. The channel estimation unit 405, therefore, needs to estimate an effective channel (HW×$1/\sqrt{\gamma_{avg}}$) so that the channel equalization unit 206 correctly performs channel equalization. Based on the pilot signal represented by expression (25) and a known pilot signal value, the channel estimation unit 405 firstly obtains an estimated effective channel given by $$H_{eff} = \begin{bmatrix} h_{eff,1} \\ h_{eff,2} \end{bmatrix} \tag{27}$$
$$= \frac{y^p}{s^p}$$
$$= \frac{\frac{1}{\sqrt{\gamma_{avg}}} H s^p}{s^p} = \frac{1}{\sqrt{\gamma_{avg}}} H$$

The channel estimation unit 405 calculates the weight matrix (W) equal to the weight matrix 38 based on an index 44 sent from the wireless communication apparatus of FIG. 5, and multiplies the estimated effective channel represented by expression (27) by the calculated weight matrix, thereby obtaining an estimated effective channel given by $$\tilde{H}_{eff} = \begin{bmatrix} \tilde{h}_{eff,1} \\ \tilde{h}_{eff,2} \end{bmatrix} = H_{eff} W = \frac{1}{\sqrt{\gamma_{avg}}} HW \tag{28}$$

The channel equalization unit 206 performs channel equalization using the estimated effective channel represented by expression (28), as given by $$y'^d = \frac{y^d}{\tilde{H}_{eff}} = s^d + d^d \tag{29}$$

As described above, the wireless communication apparatus according to this embodiment adds a perturbation vector only to a data signal, multiplies the data signal by a weight selected from a codebook, and multiplies each of a pilot signal and the data signal by a common normalization coefficient, thereby generating a transmission signal. A wireless communication apparatus on the reception side can correctly reconstruct the data signal added with the perturbation vector by correctly estimating an effective channel based on a known pilot signal value and an index indicating the selected weight, and performing channel equalization using the effective channel. That is, the wireless communication apparatus according to this embodiment can actually perform wireless communication using a perturbation vector.

Third Embodiment

Figure 7:
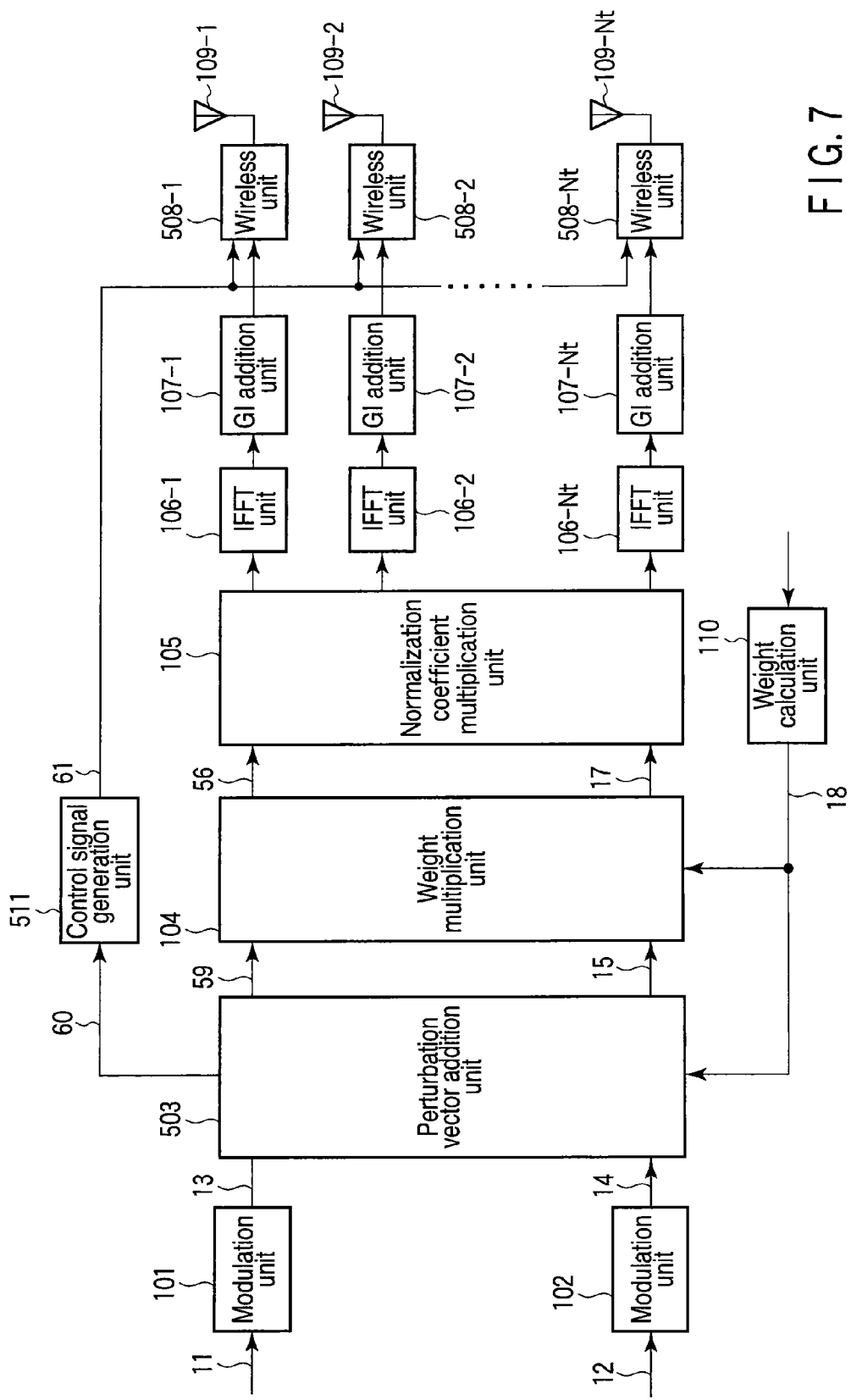
FIG. 7 is a block diagram showing a wireless communication apparatus according to the third embodiment.

As shown in FIG. 7, a wireless communication apparatus according to the third embodiment includes a perturbation vector addition unit 503 and wireless units 508-1, ..., 508-Nt in place of the perturbation vector addition unit 103 and the wireless units 108-1, ..., 108-Nt, respectively, and is additionally provided with a control signal generation unit 511. In the following description, the same parts in FIG. 7 as those in FIG. 1 have the same reference numerals, and different parts will be mainly explained.

In contrast to the above-described perturbation vector addition unit 103, the perturbation vector addition unit 503 also adds a perturbation vector 60 to a pilot signal 13. That is, the perturbation vector addition unit 503 inputs, to a weight multiplication unit 104, a data signal 15 added with a perturbation vector and a pilot signal 59 added with the perturbation vector 60. The perturbation vector addition unit 503 inputs, to the control signal generation unit 511, the perturbation vector 60 added to the pilot signal 13.

The weight multiplication unit 104 multiplies each of the pilot signal 59 and data signal 15 from the perturbation vector addition unit 503 by a weight matrix 18. The weight multiplication unit 104 inputs, to a normalization coefficient multiplication unit 105, a pilot signal 56 and a data signal 17 both of which have undergone the weight multiplication.

The control signal generation unit 511 generates a control signal 61 for notifying a wireless communication apparatus on the reception side of information indicating the perturbation vector 60 input from the perturbation vector addition unit 503. The technical significance of generating the control signal 61 will be explained later. The control signal generation unit 511 inputs the control signal 61 to the respective wireless units 508-1, ..., 508-Nt.

The wireless units 508-1, ..., 508-Nt respectively perform transmission processing for the control signal 61 in addition to transmission processing respectively performed by the wireless units 108-1, ..., 108-Nt. Each of the wireless units 508-1, ..., 508-Nt stores the control signal 61 in, for example, the preamble of a transmission signal, and each of the antennas 109-1, ..., 109-Nt transmits the transmission signal.

The technical significance of generating the control signal 61 will be explained below.

As described above, the wireless communication apparatus of FIG. 7 also adds the perturbation vector 60 to the pilot signal 13. On the contrary, the perturbation vector 60 has a value unknown to the wireless communication apparatus on the reception side. Consequently, the wireless communication apparatus on the reception side cannot estimate a correct effective channel, as is apparent from expression (16). If, however, it is possible to notify the wireless communication apparatus on the reception side of the perturbation vector 60, the wireless communication apparatus on the reception side can estimate a correct effective channel by adding the notified perturbation vector 60 to a known pilot signal. That is, even if the wireless communication apparatus on the transmission side adds the perturbation vectors to a pilot signal and data signal, respectively, generating the control signal 61 allows the wireless communication apparatus on the reception side to estimate a correct effective channel.

The control signal 61 may contain the value of the perturbation vector 60, or shifts $N_{Re}$ and $N_{Im}$ respectively indicating how far the pilot signal 13 has shifted from an original signal point in the real-axis direction and the imaginary-axis direction in the unit of a perturbation interval $\tau$. It is possible to calculate the shifts $N_{Re}$ and $N_{Im}$ by $$N_{Re} = \text{Re}\left(\frac{d^p}{\tau}\right) \quad (30)$$

$$N_{Im} = \text{Im}\left(\frac{d^p}{\tau}\right) \quad (31)$$

where $d^p$ represents the perturbation vector 60, Re( ) represents the real part of a complex value inside the parentheses, and Im( ) represents the imaginary part of a complex value inside the parentheses. Note that since the reception side knows a modulation scheme applied to a pilot sequence 11 by a modulation unit 101, it can calculate the perturbation interval $\tau$ based on the modulation scheme. Consequently, the reception side can reconstruct a perturbation vector $d^d$ using the notified shifts $N_{Re}$ and $N_{Im}$, and the calculated perturbation interval $\tau$. Since the shifts $N_{Re}$ and $N_{Im}$ respectively have integers, it is possible to express them by a small number of bits as compared with the value of the perturbation vector 60. That is, it is possible to suppress the overhead when the shifts $N_{Re}$ and $N_{Im}$ are used as the control signal 61 as compared with a case in which the value of the perturbation vector 60 is used as the control signal 61.

As described above, the wireless communication apparatus according to this embodiment also adds a perturbation vector to a pilot signal, and generates a control signal for notifying the reception side of the perturbation vector. The wireless communication apparatus on the reception side can correctly reconstruct a data signal added with a perturbation vector by estimating a correct effective channel based on a known pilot signal value and the perturbation vector notified by the control signal, and performing channel equalization using the effective channel. That is, the wireless communication apparatus according to this embodiment can actually perform wireless communication using a perturbation vector.

Fourth Embodiment

Figure 8:
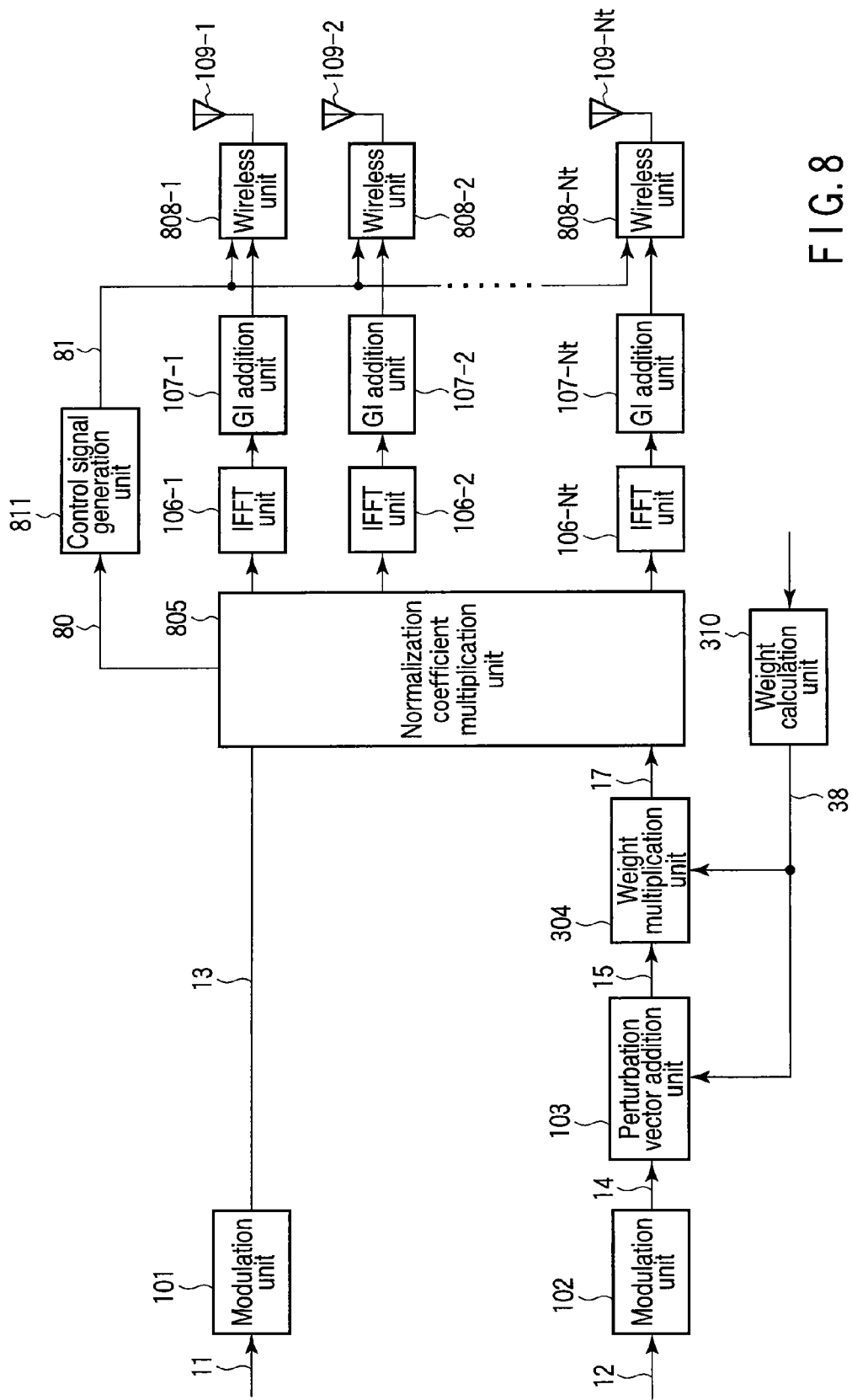
FIG. 8 is a block diagram showing a wireless communication apparatus according to the fourth embodiment.

As shown in FIG. 8, a wireless communication apparatus according to the fourth embodiment includes a normalization coefficient multiplication unit 805 and wireless units 808-1, ..., 808-Nt in place of the normalization coefficient multiplication unit 105 and the wireless units 108-1, ..., 108-Nt of the wireless communication apparatus shown in FIG. 5, respectively, and is additionally provided with a control signal generation unit 811. In the following description, the same parts in FIG. 8 as those in FIG. 5 have the same reference numerals, and different parts will be mainly explained.

A pilot signal 13 output from a modulation unit 101 is input to the normalization coefficient multiplication unit 805. The normalization coefficient multiplication unit 805 calculates a normalization coefficient 80 according to a predetermined deriving technique (for example, the above-described various deriving techniques) based on an input data signal 17 and the pilot signal 13. The normalization coefficient multiplication unit 805 only multiplies the data signal 17 by the normalization coefficient 80. That is, the normalization coefficient multiplication unit 805 uses the pilot signal 13 to calculate the normalization coefficient 80 but does not multiply the pilot signal 13 by the normalization coefficient 80. The normalization coefficient multiplication unit 805 inputs, to respective IFFT units 106-1, ..., 106-Nt, the pilot signal 13 and the data signal multiplied by the normalization coefficient 80. The normalization coefficient multiplication unit 805 also inputs the calculated normalization coefficient 80 to the control signal generation unit 811.

The control signal generation unit 811 generates a control signal 81 for notifying a wireless communication apparatus on the reception side of information indicating the normalization coefficient 80 by which the data signal 17 is multiplied by the normalization coefficient multiplication unit 805. The technical significance of generating the control signal 81 will be described later. The control signal generation unit 811 inputs the control signal 81 to the respective wireless units 808-1, ..., 808-Nt.

The wireless units 808-1, ..., 808-Nt respectively perform transmission processing for the control signal 81 in addition to transmission processing respectively performed by the wireless units 108-1, ..., 108-Nt. Each of the wireless units 808-1, ..., 808-Nt stores the control signal 81 in, for example, the preamble of a transmission signal, and each of the antennas 109-1, ..., 109-Nt transmits the transmission signal.

A wireless communication apparatus which receives a transmission signal from the wireless communication apparatus of FIG. 8 includes an antenna 201, a wireless unit 202, a GI removal unit 203, an FFT unit 204, a channel estimation unit 905, a channel equalization unit 206, a modulo operation unit 207, and a demodulation unit 208, as shown in FIG. 9. In the following description, the same parts in FIG. 9 as those in FIG. 6 have the same reference numerals, and different parts will be mainly explained.

The technical significance of generating the control signal 81 will be explained below.

As described above, the wireless communication apparatus of FIG. 8 performs transmission processing without multiplying the pilot signal 13 by the normalization coefficient 80. In this case, the wireless communication apparatus on the reception side receives a pilot signal $y^p$ given by $$y^p = H s^p \tag{32}$$

The wireless communication apparatus of FIG. 8 is the same as that of FIG. 5 in terms of transmission processing for a data signal. A data signal $y^d$ received by the wireless communication apparatus on the reception side can be expressed by expression (26).

According to expression (26), in order for the wireless communication apparatus on the reception side to appropriately perform channel equalization for a data signal 21, it is necessary to estimate an effective channel ($HW \times 1/\sqrt{\gamma_{avg}}$). Based on the pilot signal represented by expression (32) and a known pilot signal value, the channel estimation unit 905 obtains an estimated effective channel given by $$H_{eff} = \begin{bmatrix} h_{eff,1} \\ h_{eff,2} \end{bmatrix} = \frac{y^p}{s^p} = \frac{H s^p}{s^p} = H \tag{33}$$

Furthermore, the channel estimation unit 905 multiplies the estimated effective channel represented by expression (33) by a weight matrix (W) equal to a weight matrix 38 derived based on an index 44 in a codebook notified from the wireless communication apparatus of FIG. 8 and by a normalization coefficient 91 ($1/\sqrt{\gamma_{avg}}$) sent from the wireless communication apparatus of FIG. 8 using the control signal 81, thereby obtaining an estimated effective channel given by $$\tilde{H}_{eff} = \begin{bmatrix} \tilde{h}_{eff,1} \\ \tilde{h}_{eff,2} \end{bmatrix} = \frac{1}{\sqrt{\gamma_{avg}}} H_{eff} W = \frac{1}{\sqrt{\gamma_{avg}}} HW \tag{34}$$

The channel equalization unit 206 uses the estimated effective channel represented by expression (34) to perform channel equalization, as given by $$y'^d = \frac{y^d}{\tilde{H}_{eff}} = s^d + d^d \tag{35}$$

As is apparent from expression (35), even if the pilot signal 13 is not multiplied by the normalization coefficient 80, the wireless communication apparatus on the reception side can obtain the normalization coefficient 80 (91) from the control signal 81, and it is possible to appropriately perform channel equalization.

As described above, the wireless communication apparatus according to this embodiment adds a perturbation vector only to a data signal, multiplies the data signal by a weight selected from a codebook, and multiplies the data signal by a normalization coefficient derived based on the data signal and a pilot signal, thereby generating a transmission signal. Furthermore, the wireless communication apparatus generates a control signal for notifying the reception side of the normalization coefficient. A wireless communication apparatus on the reception side, therefore, can correctly reconstruct the data signal added with the perturbation vector by estimating a correct effective channel based on a known pilot signal, an index indicating the selected weight, and the normalization coefficient notified using the control signal, and performing channel equalization using the effective channel. That is, the wireless communication apparatus according to this embodiment can actually perform wireless communication using a perturbation vector.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
   a perturbation vector addition unit configured to add a perturbation vector only to a first data signal of a first transmission signal containing a first pilot signal and the first data signal, and obtain a second transmission signal containing the first pilot signal and a second data signal;
   a weight multiplication unit configured to multiply the second transmission signal by a weight for removing interference on a reception side, and obtain a third transmission signal containing a third data signal;
   a normalization coefficient multiplication unit configured to multiply the third transmission signal by a common normalization coefficient for normalizing a total transmission power, and obtain a fourth transmission signal containing a fourth data signal; and
   a transmission unit configured to transmit the fourth transmission signal.

2. The apparatus according to claim 1, wherein the normalization coefficient is common within each symbol group obtained by time-dividing each resource block assigned to the reception side.

3. The apparatus according to claim 1, wherein the normalization coefficient is common within each symbol group obtained by time-dividing each burst assigned to the reception side.

4. The apparatus according to claim 1, wherein the normalization coefficient is common within each transmission frame.

5. The apparatus according to claim 1, wherein
   the weight multiplication unit multiplies each of the first pilot signal and the second data signal of the second transmission signal by the weight, and obtain the third transmission signal containing a second pilot signal and the third data signal, and
   the normalization coefficient multiplication unit multiples each of the second pilot signal and the third data signal of the third transmission signal by the common normalization coefficient, and obtain the fourth transmission signal containing a third pilot signal and the fourth data signal.

6. The apparatus according to claim 1, wherein
the weight multiplication unit multiplies only the second data signal of the second transmission signal by a weight candidate, that is specified by feedback information from the reception side, of a plurality of weight candidates previously shared with the reception side, and obtain the third transmission signal containing the first pilot signal and the third data signal, and
the normalization coefficient multiplication unit multiplies each of the first pilot signal and the third data signal of the third transmission signal by the common normalization coefficient, and obtain the fourth transmission signal containing a second pilot signal and the fourth data signal.

7. The apparatus according to claim 1, further comprising:
a control signal generation unit configured to generate a control signal transmitted by the transmission unit together with the first pilot signal for notifying the reception side of information indicating the normalization coefficient, and wherein
the weight multiplication unit multiplies the second data signal of the second transmission signal by the weight, and
the normalization coefficient multiplication unit multiplies only the third data signal of the third transmission signal by the common normalization coefficient.

8. The apparatus according to claim 1, wherein the normalization coefficient is common within each resource block assigned to the reception side.

9. The apparatus according to claim 1, wherein the normalization coefficient is common within each burst assigned to the reception side.

10. A method of wirelessly communicating comprising:
adding a perturbation vector only to a first data signal of a first transmission signal containing a first pilot signal and the first data signal;
obtaining a second transmission signal containing the first pilot signal and a second data signal;
multiplying the second transmission signal by a weight for removing interference on a reception side;
obtaining a third transmission signal containing a third data signal;
multiplying the third transmission signal by a common normalization coefficient for normalizing a total transmission power;
obtaining a fourth transmission signal containing a fourth data signal; and
transmitting the fourth transmission signal.

11. The method according to claim 10, wherein the normalization coefficient is common within each symbol group obtained by time-dividing each resource block assigned to the reception side.

12. The method according to claim 10, wherein the normalization coefficient is common within each symbol group obtained by time-dividing each burst assigned to the reception side.

13. The method according to claim 10, wherein the normalization coefficient is common within each transmission frame.

14. The method according to claim 10, further comprising
multiplying each of the first pilot signal and the second data signal of the second transmission signal by the weight;
obtaining the third transmission signal containing a second pilot signal and the third data signal;
multiplying each of the second pilot signal and the third data signal of the third transmission signal by the common normalization coefficient; and
obtaining the fourth transmission signal containing a third pilot signal and the fourth data signal.

15. The method according to claim 10, further comprising
multiplying only the second data signal of the second transmission signal by a weight candidate, that is specified by feedback information from the reception side, of a plurality of weight candidates previously shared with the reception side;
obtaining the third transmission signal containing the first pilot signal and the third data signal;
multiplying each of the first pilot signal and the third data signal of the third transmission signal by the common normalization coefficient; and
obtaining the fourth transmission signal containing a second pilot signal and the fourth data signal.

16. The method according to claim 10, further comprising:
generating a control signal for transmission together with the first pilot signal to notify the reception side of information indicating the normalization coefficient;
multiplying the second data signal of the second transmission signal by the weight; and
multiplying only the third data signal of the third transmission signal by the common normalization coefficient.

17. The method according to claim 10, wherein the normalization coefficient is common within each resource block assigned to the reception side.

18. The method according to claim 10, wherein the normalization coefficient is common within each burst assigned to the reception side.

* * * * *